INVENTORS
Bruce I. Bertelsen
Hans G. Hottenrott
Herbert J. Kump
BY Carroll B. Quaintance
ATTORNEY March 25, 1969 B. I. BERTELSEN ET AL 3,435,428

DISPERSION LOCKED MEMORY

Filed Dec. 31, 1963 Sheet 2 of 2

INVENTORS
Bruce I. Bertelsen
Hans G. Hottenrott
Herbert J. Kump

BY [signature]

ATTORNEY 3,435,428
DISPERSION LOCKED MEMORY

Bruce I. Bertelsen, Hans G. Hottenrott, and Herbert J. Kump, Poughkeepsie, N.Y., assignors to International Business Machines Corporation, New York, N.Y., a corporation of New York
Filed Dec. 31, 1963, Ser. No. 334,858
Int. Cl. G11b 5/00; H01f 7/06
U.S. Cl. 340—174 26 Claims

ABSTRACT OF THE DISCLOSURE

Interaction of two or more regions of uniform magnetization having non-parallel easy axes for stabilizing the magnetization in the vicinity of respective hard axes of the regions, and methods and apparatus for using the interaction for recording and reading signals in the easy and hard directions are described herein.

This invention relates to magnetic memory devices in which limited areas or elements of magnetic material are selectively magnetized to represent bits of information. The invention especially resides in the method of establishing selected magnetic states in magnetic film and in apparatus for performing the method, and in a memory system composed of an array or matrix of such limited areas or elements.

The object of this invention is to establish selectively any of a plurality of remanent states of magnetization oriented along intersecting hard and easy axes of an anisotropic area or element of magnetic material so that said remanent states may represent bits of information.

It is a further object of this invention to sense the remanent states existing in said area or element so as to ascertain the information represented.

It is a further object of this invention to represent bits of information in the memory elements of a memory array or matrix by selectively establishing remanent states of magnetization oriented along intersecting hard and easy axes of said elements and to sense said elements to ascertain the information represented in the array.

In the preferred form, the material constituting the magnetizable element and having a magnetizable area comprises a uniaxial anisotropic film of magnetic material having substantial angular dispersion so that the easy and hard axes are dispersed over a range of the angle of dispersion on opposite sides of central axes. A remanent state may be established in such a film along a hard axis in a direction within the range of the angle of dispersion on either side of the hard axis; i.e., the family of dispersed hard axes lies within a sector measured by an arc equal to twice the angle of dispersion, and the magnetization state may be said to be "dispersion locked" in the direction of the hard axis sector.

The magnetization along a hard axis may be established by a magnetic field of sufficient intensity in that direction. To establish a remanent magnetization in the direction of an easy axis, two fields are applied, one in the direction of an easy axis but insufficient in intensity to establish remanence, and a second field in the direction of the hard axis sector, the two fields combining to form a resultant field which is of the necessary intensity and direction to establish a remanent field in a direction within the range of said easy axes.

The use of remanent states of magnetization which are "dispersion locked" along hard axes and normally remanent along easy axes and which may be switched from one state to another to represent information, has numerous advantages over the known method of switching between two states of magnetization in opposite directions along an easy axis, known as 180° switching. Coincident fields are required only in switching toward the easy axis, or in one easy axis direction, and unipolar bit drives may be used, simplifying circuitry and tolerances. The present embodiment of the invention, using thin film of magnetic material, results in shorter memory cycle time of the order of 25%, and in the worst case, the voltage amplitude can be 10% to 40% higher than the worst case of 180° mode voltage signal amplitude.

The magnetization is more stable and less subject to adjacent pulses and other disturbances. The hard direction magnetization state is insensitive to repetitive easy direction pulsing within the useful easy axis field amplitude range, which may be defined as the range from $H_b$(min.), the easy direction or bit field required to switch 80% of flux into an easy direction from a hard direction state when coupled with a word field to $$H_b(\text{max.}) = H_b(\text{min.}) + \text{tolerance}$$

on applied bit field. Also, the bit field does not oppose the easy direction magnetization, and the system may be said to be "disturb insensitive." A serious problem of loss of information in thin film memories is also avoided, as the high dispersion film is less subject to "creep" or the influence of repetitive stray fields on the magnetization, which tend to destroy the remanent state.

Elements formed of magnetic material which may be magnetized into different remanent states are now in use for storing bits of information. Magnetic cores are best known, but magnetic films have the subject of many investigations and have been widely reported in the literature.

The material most widely used is nickel-iron alloy in proportions on the order of 80% nickel to 20% iron, which exhibits an easy axis in the preferred direction of magnetization. The ideal anisotropic film, as assumed in the literature [see Stoner and Wohlfarth, Trans. Roy. Sec. (London), A. 240, 599 (1948)], is homogeneous with the magnetization uniform and the vectors of the magnetic moments parallel to the easy axis, or axis of preferred magnetization, when no external field is applied. The axis perpendicular to the easy axis is the hard axis and magnetization in the direction of the hard axis is unstable, the magnetic moments returning to their position parallel to the easy axis upon removal of the magnetic field.

In actual practice, the magnetic material of the film is characterized by regions of uniform magnetization, which differ in magnitude and direction of the magnetic moments so that the film is not homogeneous as in the ideal film. This property is known as "dispersion," "amplitude dispersion" denoting the variation in magnitude and "angular dispersion" denoting the variation of the magnetization in direction. The angular dispersion is especially of interest in investigation of switching properties of the material. The term "dispersion locked" as used herein describes an interaction of two or more regions of anisotropic magnetic material having non-parallel easy axes which can result in stabilizing the magnetization of the regions in the vicinity of their respective hard axes. This interaction, or coupling, can be achieved on a macroscopic scale or, as in the preferred embodiment, microscopic or sub-microscopic elements interacting at very short distances accomplish the "dispersion locking" in the hard direction sector.

The domains or regions of uniform magnetization may be separated by "walls" or transition regions of magnetization direction, and these walls may enter into the switching action of the film when subjected to a magnetic field. (See Thin Magnetic Films, S. Methfessel, W. E. Proebster, and C. Kinberg, Information Processing, Proceedings of the International Conference on Information Processing, Unesco, Paris, 1959.) These walls move under the force exerted by a magnetic field greater than the threshold force for the wall, this threshold force varying with the angular dispersion, so that when the angular dispersion is small, the walls are easily moved by weak magnetic fields. Conversely, with large angular dispersion, a greater magnetic force is required to cause wall motion.

The foregoing and other objects, features and advantages of the invention will be apparent from the following more particular description of preferred embodiments of the invention, as illustrated in the accompanying drawings.

In the figures:

FIGURES 1*a* and 1*b* illustrate the hysteresis loops in an ideal thin film of magnetic material;

FIGURES 2*a* and 2*b* illustrate the hysteresis loops in a thin film of magnetic material used in this invention;

Figure 9:
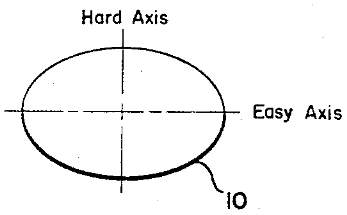
Figure 6A:
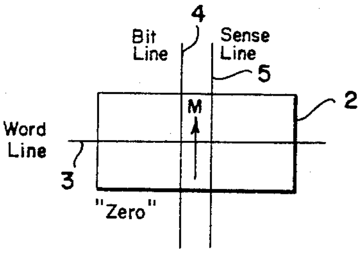
Figure 6B:
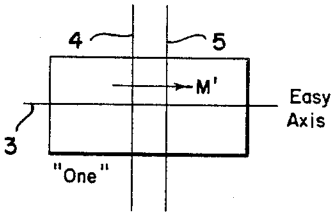
Figure 6C:
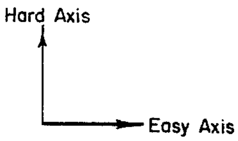
Figure 7A:
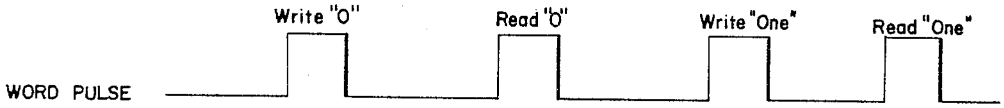
Figure 7B:
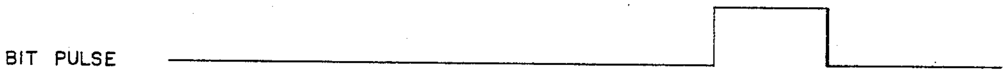
Figure 7C:
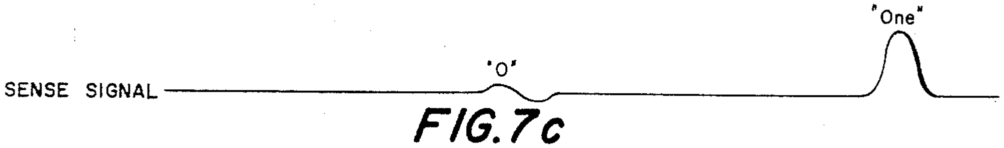
Figure 8:
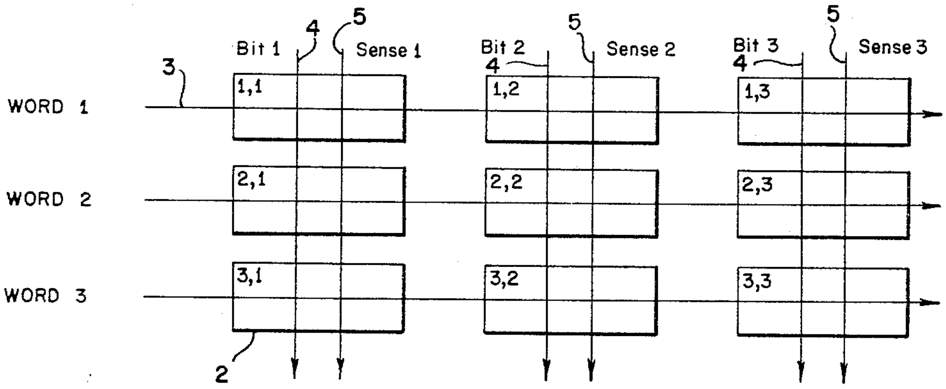

FIGURES 6*a*, 6*b* and 6*c* illustrate the drive line configuration and the resulting magnetization in a magnetized area of a memory element in accordance with this invention;

FIGURES 7*a*, 7*b* and 7*c* illustrate the currents in magnetizing and sensing the magnetized area of a memory element in different states according to different bits of information;

FIGURE 8 shows a matrix or array of memory areas forming a memory;

FIGURE 9 shows a memory element of a shape especially adapted to this invention.

Figure 1A:
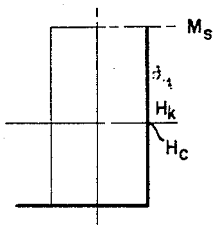
Figures 1B, 2B, 3:
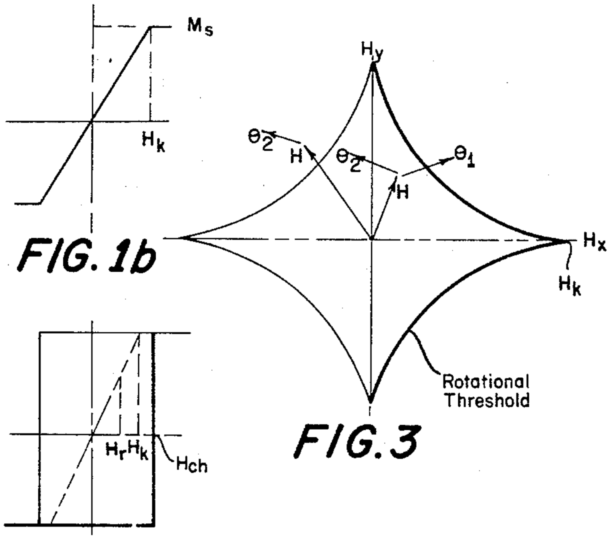
FIGURE 3 is a curve of the rotation threshold of an ideal film.
Figure 2A:
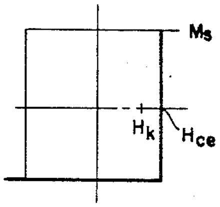

In the ideal film, as assumed by Stoner and Wohlfarth (above), the anisotropy is such that the film exhibits an easy direction hysteresis loop as in FIGURE 1*a* and a straight line hard direction loop as in FIGURE 1*b*. A magnetic field greater than $H_c$ directed along the easy axis establishes a remanent state along that axis. Along the hard axis, the magnetization induced by a field is unstable and the hysteresis loop is a straight line, the magnetic moments returning to their original direction relative to the easy axis when the field is removed.

The theoretical operation of the ideal film with uniform magnetization is illustrated by the curve $$H_k^{2/3}=H_x^{2/3}+H_y^{2/3}$$

as shown in FIGURE 3. This curve represents the magnitude of the field necessary to rotate the magnetic moments; that is, the rotational threshold. When the vector of field H lies within the rotational threshold, no switching of the magnetic moments can occur. Under this field condition, magnetization can take one or two directions, $\theta_1$ or $\theta_2$, depending on the prior history of the field. When H exceeds the rotational threshold, the field vector lies outside the curve and a force acts on the magnetic moments to rotate them toward the direction of the applied field (see Methfessel et al., above). The rotational threshold is denoted by $H_k$, which is the magnitude of the magnetic field necessary to rotate the magnetic moments into a direction along the hard axis. In an anisotropic film of uniform magnetization, such state is unstable and the magnetization returns to the direction of the easy axis with removal of the field, so that only two remanent states of magnetization are possible, in opposite directions along the easy axis. The film is switched from one state to the other by rotation of the magnetic moments through 180°, as explained by Methfessel et al. (above).

Figure 4:
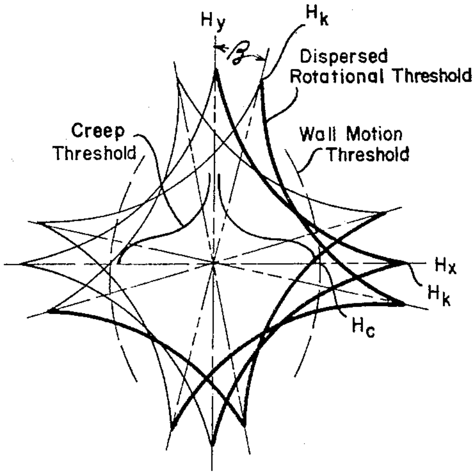
FIGURE 4 is a set of curves illustrating the rotational threshold at different points and the wall threshold in an actual film of the type generally used in thin film memories.

The known uniaxial anisotropic film is, in fact, not the ideal as described above, but generally exhibits a certain degree of angular dispersion. (Anisotropy in Nickel-Iron Films, D. O. Smith, Journal of Applied Physics, Supp. to vol. 32, No. 3, pp. 70S–80S, March 1961.) As is shown in FIGURE 4, the easy and hard axes may vary in direction in different regions as much as the degree of angular dispersion $\beta$, so the axes and rotational threshold curves for all the regions form a family of curves for the area of magnetization. Thus it may be said that the angular dispersion $\beta$ represents the dispersion of the direction of the axes throughout the area, so that the direction of the hard or easy axis, which may vary from region to region, lies within a range of $\pm\beta$, the angle of dispersion. As a result of this dispersion of the axes, a magnetic field of sufficient intensity in a direction within the range of dispersion of one of the axes will produce a remanent state of magnetization in that direction.

Another factor important to the switching operation is the wall motion threshold for an applied D.C. field, which has a value equivalent to the coercive force $H_c$ and in many films is less than the anisotropic field $H_k$. In 180° switching, if the field applied exceeds in magnitude and direction the wall motion threshold, a much slower switching process results, since wall motion switching is 1000 times slower than coherent rotation. The walls also may be affected by repetition of stray fields, which tend to cause motion of the walls if greater than indicated by the curve shown as the creep threshold with destruction of the remanent magnetization and loss of information.

The uniaxial anisotropic material, such as the thin film used in the preferred embodiment of this invention, is characterized by substantial angular dispersion of such magnitude that a field applied within the range of dispersion of the hard axis will establish a remanent state of magnetization in the direction of the field. (R. Spain and H. Rubinstein, Journal of Applied Physics, vol. 32, 2885, March 1961.) In the easy direction loop which is similar to that of the ideal film, the field $H_{ce}$, which is the coercive force in the direction of the easy axis, and which is usually greater than the anisotropic field $H_k$, establishes a remanent state of magnetization along the easy axis as shown. The stable state within the range of the hard axis may also be represented by a square hysteresis loop as in FIGURE 2*b*, in which $H_{ch}$ represents the coercive force to establish a remanent state. When the field of magnitude $H \leqslant H_r$ is applied along the hard axis, the induced magnetization will be reversible. When the field $H=H_{ch}>H_r$, the induced magnetization will be oriented in the hard axis sector and will "lock" in a remanent state, which is established by rotation of the magnetic moments. The region between $H_r$ and $H_k$ is a transition to the fully locked state and is not defined. (See Static Reversal Processes in Ni-Fe Films, S. Middelhoek, IBM Journal of Research and Development, vol. 6, No. 4, pp. 394–406, October 1962.) While the measured angular dispersion may vary widely between 5° and 60°, a value within 10° to 20° is preferred for this invention.

Figure 5:
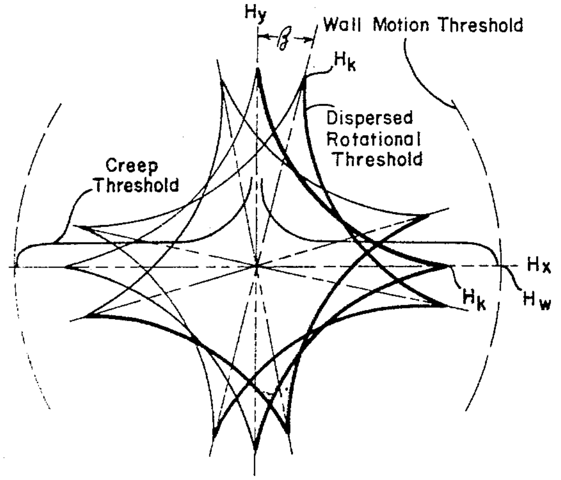
FIGURE 5 is a set of curves similar to FIGURE 4, illustrating the wall threshold in a film especially adapted to this invention.

The switching characteristics of this film is illustrated by the curves in FIGURE 5. The angular dispersion of this film is of such magnitude that the anisotropic field $H_k$ is substantially smaller than the threshold field $H_w$ for motion of the walls. If the applied D.C. field is now less than $H_w$, or the pulsed field is less than the creep threshold, no wall motion will occur. When a magnetic field of magnitude greater than $H_k$ is applied in one direction within the range of the hard axis, the induced magnetization will "lock" in the direction of the field, establishing a state of remanence in that direction.

This property of the film may be used to provide remanent states of magnetization oriented within the range of either the easy or hard axis, as illustrated in FIGURES 6 to 8, and thus can provide a memory system for representing bits of information. In this particular embodiment, a film area or element 2 may be subjected to magnetic fields produced by the "word line" 3 or by "bit line" 4 adjacent its surface. Current in word line 3 generates a field M in the direction of the hard axis, as in FIGURE 6*c*, and "bit line" 4, perpendicular to word line 3, generates a field M' oriented along the easy axis.

When a pulse is transmitted over word line 3 to generate a field greater than $H_k$ (FIGURE 5), a remanent state of magnetization is established oriented along the hard axis. If the binary number system is represented by remanent states along the two axes, magnetization directed along the hard axis may represent "zero," so that the word pulse would write a "zero" into the memory area. A remanent state in a direction along the easy axis to represent "one" is established by the combination of fields from pulses of the word line 3 and bit line 4. The field along the easy axis produced by the bit pulse is too weak to switch the magnetization from the hard axis direction, but the two fields produced by the two pulses combine to form a resultant field in direction and magnitude beyond the rotational threshold curve, so the magnetization is switched toward the easy axis. The field of the bit pulse continues after termination of the word pulse field, as shown in FIGURE 7*b*, so the magnetization will be established within the range of the easy axis.

The magnetization state in the memory area may be sensed to "read out" either the "zero" or "one" by signals produced in a "sense line" 5 adjacent the film and parallel to the bit line 4 when the "read" pulse is transmitted along the "word line" 3 to generate a field in the direction of the hard axis. If the area is in a remanent state within the easy axis range, the change in direction of magnetization will induce a pulse in the sense line 5, as indicated in FIGURE 7*c*. If the remanent state exists in the direction of the hard axis, only a small change in field will result, and the sense line 5 will be subjected to a lesser change of field, resulting in only a small or negligible pulse. Where the maintenance of the information in memory is not required, the "read" pulse may be as strong as the "word" pulse, to switch the magnetization along the easy axis to the hard axis, producing a strong pulse in sense line 5.

To retain the information in memory without rewriting, a non-destructive read out is necessary. The "read" pulse is of less strength than the word pulse used for writing and is insufficient to establish a remanent state within the hard axis range and destroy the remanence along the easy axis. Rotation of the magnetization from the easy axis direction and back will produce a pulse in sense line 5, to denote a "one" in the memory. The remanent state along the hard axis would have a less effect, as previously described.

A number of the areas or elements 2 may be arranged in rows and columns as a matrix to form a memory array (FIGURE 8). A "word line" 3 extends along the easy axes of the areas of each row, so that a word pulse in the line will establish remanent states along the hard axes of the areas in the row. In each column, a bit line 4 extends parallel to the hard axes to establish magnetic fields parallel to the easy axes of the areas in the column. A sense line 5 parallel to the bit line 4 also extends along each column. To establish a remanent state in a selected area, i.e., 2, 3 in FIGURE 8, a word pulse on word line No. 2 and a bit pulse on bit line No. 3 are transmitted concomitantly, so that magnetization will be established along the easy axis. If used in a binary system, a "one" may be represented in any selected area by the transmission of word and bit pulses in the lines common to the area. The memory array may be read by pulses along each word line to produce strong signals in the sense lines of the areas having "ones" registered, while "zero" is indicated by a lesser or negligible signal.

A special shape of memory element 10 for use in this invention is shown in FIGURE 9. When a rectangular element is used, it was found that the corners were areas where demagnetizing fields prevented hard direction locking, thus increasing the effective zero signal in reading. The elliptical form eliminates these easy direction demagnetizing field components and has been found to be more effective in signal discrimination.

The signal discrimination may be improved by application of a negative bias pulse on the sense amplifier, so that the zero signal is never positive, and consequently reduce the signal requirement.

The film used for magnetization in two stable remanent states of magnetization oriented along orthogonal axes is preferably fabricated to have a substantial angular dispersion with the magnitudes of the coercive forces in the directions of the hard and easy axes as large or larger than the magnitude of the anisotropy field. One factor by which the degree of dispersion can be affected is nonuniformity of the film thickness and this may be determined by the grain size of the deposited material. The film is produced by vacuum deposition, and control is achieved by maintaining the deposition rate constant and varying the substrate temperature to give the grain size and angular dispersion desired. The substrate is of any of several highly conductive, highly polished metals, such as copper, silver, aluminum, or silver-copper alloys. The substrate is heated in vacuum for one hour to a temperature of 350° C. and a layer of chromium is deposited to a thickness of 700 A., to provide for good adhesion of subsequent layers. Next SiO is deposited at a temperature of 300° C. to a thickness of 1.5 microns for surface smoothness (See Silicon Monoxide Undercoating for Improvement of Magnetic Film Memory Characteristics, B. I. Bertelsen, Journal of Applied Physics, vol. 33, No. 6, 2026–2030, June 1962).

The Ni-Fe coating is deposited at 40 A. per second from 100 grams of 82.5% Ni, 17.5% Fe in an alumina crucible, induction heated and positioned 18 inches below the substrate, which has a temperature of 360° C. A D.C. magnetic field of over 30 oersteds is applied parallel to the substrate during deposition of the Ni-Fe and until the substrate has cooled to 100° C. The Ni-Fe film may then be etched to form an elliptical pattern.

While the invention has been particularly shown and described with reference to preferred embodiments thereof, it will be understood by those skilled in the art that the foregoing and other changes in form and details may be made therein without departing from the spirit and scope of the invention.

What is claimed is:

1. The method of selectively magnetizing an element of magnetic material which has the property of being magnetizable to stable remanent states oriented along any one of a plurality of lines extending in different directions, said method comprising, as one step, applying a single magnetic field oriented along one line in one direction of an intensity to establish a remanent state of magnetization directed along said one line, and as a second step, applying a field oriented along said one line and concomitantly a second magnetic field at an angle to said one line insufficient to establish a remanent state, said two fields combining to form a resultant field of sufficient intensity and direction to establish a second remanent state oriented along a line at an angle to said one line.

2. The method claimed in claim 1, in which said first field is terminated before termination of said second field.

3. The method of establishing selectively any one of a plurality of remanent states of magnetization oriented along any of a plurality of intersecting axes in a magnetic element comprising, as one step, applying a single magnetic field of sufficient intensity and direction to establish one of said remanent states oriented along one of said axes and, as another step, applying a magnetic field along said one of said axes concomitantly with a second magnetic field at an angle to said first field of insufficient intensity to establish a remanent state, said two fields combining to form a resultant field of sufficient intensity and direction to establish a remanent state along another of said axes.

4. The method of establishing selectively any one of a plurality of remanent states of magnetization in a limited area of an uniaxial anisotropic element of magnetic material, the angular dispersion of said area being of such magnitude that remanent states of magnetization may be established oriented along intersecting orthogonal central hard and easy axes and axes dispersed on either side of said central axes within the angle of dispersion, said method comprising, as one step, applying a magnetic field to said limited area oriented along an axis within the range of the dispersed hard axes of an intensity sufficient to establish one of said remanent states of magnetization in the direction of said field and, as another step, applying a magnetic field along an axis in said range of hard axes concomitantly with another magnetic field oriented along an axis in said range of easy axes of an intensity insufficient to establish a remanent state of magnetization in the direction of said last-named axis, said two fields combining to form a resultant field of sufficient intensity and direction to be out of the range of said hard axes so that a remanent state of magnetization is established oriented along an easy axis.

5. The method of establishing selectively any one of a plurality of remanent states of magnetization in a limited area of an uniaxial anisotropic element formed of film of magnetic material, the angular dispersion of said area being of such magnitude that remanent states of magnetization may be established oriented along intersecting orthogonal hard and easy axes and axes dispersed on either side of said central axes within the angle of dispersion, said method comprising, as one step, applying a magnetic field to said limited area oriented along a hard axis of an intensity sufficient to establish a remanent state of magnetization in the direction of said field and, as another step, applying one magnetic field oriented along an axis of insufficient intensity and direction to establish remanence concomitantly with a magnetic field oriented along an intersecting axis of sufficient intensity and direction to combine with said one magnetic field to form a resultant field of sufficient intensity to establish a remanent state of magnetization oriented along an axis intersecting said hard axis.

6. The method as defined in claim 5, and, as a further step, applying a magnetic field along one axis and sensing a change in direction of a field produced by applying such field, so that a state of magnetization along an intersecting axis will be sensed by the change in magnetic field resulting from the effect of said applied magnetic field on said magnetization along an intersecting axis.

7. The method of establishing selectively any one of a plurality of remanent states of magnetization oriented along intersecting axes in a limited area of an uniaxial anisotropic element formed of film of magnetic material, the angular dispersion of said area being of such magnitude that remanent states of magnetization may be established oriented along intersecting orthogonal central hard and easy axes and axes dispersed on either side of said central axes within the angle of dispersion, said method comprising, as one step, applying a magnetic field to said limited area oriented along a hard axis of an intensity sufficient to establish one of said remanent states of magnetization in the direction of said field, and, as another step, applying a magnetic field oriented along a hard axis concomitantly with another magnetic field oriented along an easy axis of an intensity insufficient to establish a remanent state of magnetization in the direction of said another field, said two fields combining to form a resultant field at an angle to each of said two fields of an intensity and direction to switch the magnetization away from said hard axis and toward said easy axis, said resultant field establishing a remanent state of magnetization oriented along an easy axis.

8. The method defined in claim 7, in which said magnetic field oriented along an easy axis continues after termination of said first magnetic field.

9. The method of registering and sensing a plurality of bits of information by magnetization of a limited area of an uniaxial anisotropic element formed of film of magnetic material, the angular dispersion of said area being of such magnitude that remanent states of magnetization may be established oriented along intersecting central hard and easy axes and axes dispersed on either side of said central axes within the angle of dispersion, said method comprising registering bits of information by, as one step, applying a magnetic field of greater intensity than the anisotropy field oriented along a hard axis to establish a remanent state of magnetization along said hard axis and, as another step, applying concomitantly with a field oriented along a hard axis another magnetic field oriented along an easy axis of insufficient intensity to establish a remanent state in the direction of the easy axis, the resultant magnetic field at an angle to each of said axes establishing a remanent state along an easy axis upon removal of said first-named magnetic field, and sensing said areas to ascertain the information registered by, as one step, applying a field oriented along said hard axis and sensing a change in field resulting from a remanent state of magnetization oriented along the easy axis produced as a result of applying said last-named field to ascertain a bit of information registered by a remanent state oriented along said easy axis, a remanent state of magnetization along said hard axis with said last applied field producing no change in a direction along said easy axis, so that sensing a change in field will distinguish from the change caused by the magnetization along the easy axis.

10. The method of registering information in an array of areas of uniaxial anisotropic magnetic material by establishing selectively any one of a plurality of remanent states in each of said areas, the angular dispersion of each area being of such magnitude that remanent states of magnetization may be established oriented along intersecting orthogonal central hard and easy axes and axes dispersed on either side of said central axes within the angle of dispersion, said method comprising, as one step, registering one bit of information in each of said areas by applying a field oriented along a hard axis of sufficient intensity to establish a remanent state in the direction of a hard axis in each area, and, as another step, registering selected bits of information in certain of said areas by applying a field along an easy axis in each of said certain areas insufficient to establish remanence concomitantly with a field along a hard axis of sufficient intensity to combine with said field along an easy axis to form a resultant field at an angle to both said fields and of sufficient intensity and direction to establish a remanent state along an easy axis, so that distinctive bits of information are registered in selected areas.

11. The method of registering information as in claim 10 and of sensing such information which comprises the step of applying a field to each area oriented along a hard axis, and sensing any change in field in any of said areas resulting from a change in field produced by said applied field on the magnetization of any of said areas along the easy axis to ascertain the bits of information represented by magnetization along an easy axis.

12. The method of determining which one of a plurality of states of magnetization exists in magnetic material, in which said material has an uniaxial anisotropic characteristic such that said material has alternatively a first remanent magnetization state directed along an easy axis and a second remanent magnetization state orthogonal to said first state directed along a hard axis, the step of applying a magnetic field directed along said hard axis to produce a magnetic field directed at an angle to said axis when said material is in said first magnetization state, and sensing the pulse produced in a conductor by the change in field.

13. The method of claim 12 in which said applied magnetic field is insufficient to establish said second remanent magnetization state along said hard axis.

14. A system of registering and regaining any of a plurality of bits of information comprising, in combination, a limited area of an uniaxial anisotropic element formed of film of magnetic material, the angular dispersion of said area being of such magnitude that remanent states of magnetization may be established oriented along intersecting orthogonal central hard and easy axes and axes dispersed on either side of said central axes within the angle of dispersion, conductor means adjacent and in magnetic relation to said area to apply magnetic fields to said area selectively to establish remanent states representing said bits of information and to sense an established remanent state of magnetization to produce signals representing said bits of information, one of said conductor means extending in a direction to apply a magnetic field to said area oriented along a hard axis to establish a remanent state of magnetization in the direction of said hard axis, other conductor means extending at an angle to said one of said conductor means to apply a magnetic field in the direction of an easy axis of insufficient intensity and direction to establish remanence and also to sense a magnetic field transverse to said other conductor means, said conductor means acting concomitantly to apply magnetic fields along hard and easy axes to said area so that a resultant field is formed to establish a remanent state of magnetization oriented along an easy axis, said other conductor means sensing a magnetic field formed by a field applied by said first conductor when an established remanent state exists along an easy axis, so that a resultant field is formed transverse to said other conductor means and a signal is produced thereby.

15. In a system for representing bits of information by magnetized areas, an array of limited areas of uniaxial anisotropic magnetic material having an easy axis in one direction and a hard axis perpendicular to said easy axis, the angular dispersion of each of said areas being of such magnitude that remanent states of magnetization may be established oriented along said perpendicular hard and easy axes and axes dispersed on either side of said perpendicular axes within the angle of dispersion, said areas being arranged in rows having easy axes in each row extending in the direction of the row, and having conductor means extending along said rows adjacent said areas, the said areas also being arranged in columns perpendicular to said rows and having hard axes extending in the direction of said columns, and having conductor means extending along said columns adjacent said areas, said conductor means along said rows transmitting pulses selectively along said rows to apply a magnetic field in the direction of a hard axis in each of the areas in a selected row of sufficient magnitude to establish a remanent state of magnetization in the direction of said hard axis in each of said areas of said selected row, said conductor means along said columns transmitting pulses selectively along said columns to apply a magnetic field in the direction of any easy axis in each of the areas in a selected column of insufficient magnitude to establish a remanent state but combining with a pulse in a row to form a resultant field in an area common to a selected row and selected column of sufficient intensity to establish remanence, so that a remanent state of magnetization is established in said selected area parallel to said easy axis, thereby magnetizing certain selected areas in a remanent state in the direction of a hard axis to represent one bit of information and magnetizing certain other selected areas in a remanent state in the direction of an easy axis to represent a different bit of information, said conductor means extending along said columns sensing a change in field transverse to said conductor means produced upon passage of a current pulse through the conductor means in a selected row adjacent an area in a remanent state of magnetization in the direction of an easy axis, so as to ascertain those areas containing said different bits of information.

16. In combination, a discrete element of uniaxial anisotropic film of magnetic material, the angular dispersion of said element being of such magnitude that remanent states of magnetization may be established oriented along intersecting orthogonal central hard and easy axes and axes dispersed on either side of said central axes within the angle of dispersion, said element having its greatest dimension along said central easy axis, means for applying a field of suffiicent intensity oriented along a hard axis to establish a remanent state oriented along said hard axis, and means to produce a field along an easy axis of insufficient intensity to establish remanence in combination with a field along said hard axis, said two fields forming a resultant field of sufficient intensity to establish a remanent state oriented along an easy axis.

17. The combination defined in claim 16, in which said element is in the form of an ellipse with its major axis substantially coincident with said central easy axis.

18. In combination, an anisotropic element of magnetic material having hard and easy axes of magnetization, the angular dispersion of said element being of such magnitude that remanent states of magnetization may be established oriented along either an easy axis or along a hard axis and axes dispersed on either side of said hard axis within the angle of dispersion, and means to apply selectively a magnetic field to said element oriented along a hard axis within said angle of dispersion to establish a remanent state of magnetization within said angle of dispersion, or two separate fields which form a resultant field directed at an angle to a hard axis beyond said angle of dispersion to establish a remanent state of magnetization oriented along said easy axis, so that different states of magnetization may be established to represent different items of information.

19. In combination, an anisotropic element of magnetic material having hard and easy axes of magnetization, the angular dispersion of said element being of such magnitude that remanent states of magnetization may be established oriented along either an easy axis or along a hard axis and axes dispersed on either side of said hard axis within the angle of dispersion, means to apply a magnetic field to said element oriented along a hard axis within said angle of dispersion to establish a remanent state of magnetization, and means to apply a magnetic field oriented along an easy axis concomitantly with and after application of a magnetic field oriented along a hard axis within the angle of dispersion to form a resultant field outside said angle of dispersion of said hard axis and subsequently to establish a remanent state of magnetization oriented along said easy axis.

20. In the combination defined in claim 19, means to sense the change of magnetization produced by the application of a magnetic field oriented along a hard axis, so that when said element is in a remanent state of magnetization along said easy axis, said change is of greater magnitude than would be caused by a remanent state within said angle of dispersion of said hard axis, thereby indicating the existence of one of said remanent states of magnetization.

21. In a system for representing information, the combination of a plurality of areas of anisotropic magnetic material having hard and easy axes of magnetization, the angular dispersion of said areas being of such magnitude that remanent states of magnetization may be selectively established oriented along either easy axes or along hard axes and axes dispersed on either side of said hard axes within said angle of dispersion, and means to establish a remanent state of magnetization along an axis within the angle of dispersion of said hard axis in each of certain of said areas and to establish selectively a remanent state of magnetization along an easy axis in each of certain of said areas.

22. In a system for representing information, the combination of a plurality of areas of anisotropic magnetic material having hard and easy axes of magnetization, the angular dispersion of said areas being of such magnitude that remanent states of magnetization may be selectively established oriented along either said easy axes or along said hard axes and axes dispersed on either side of said axes within the angle of dispersion, and means to establish remanent states of magnetization selectively in each of said areas oriented along either a hard axis within said angle of dispersion or along an easy axis, comprising means to apply a magnetic field to each of said areas oriented along a hard axis within said angle of dispersion to establish a remanent state of magnetization oriented along said hard axis, and means to apply a magnetic field to each of certain selected areas oriented along said easy axis concomitantly with and after a magnetic field oriented along a hard axis, said last magnetic field in cooperation with said first magnetic field establishing a remanent state of magnetization oriented along said easy axis.

23. In a system for representing information, the combination of a plurality of areas of anisotropic magnetic material having hard and easy axes of magnetization, the angular dispersion of said areas being of such magnitude that remanent states of magnetization may be selectively established oriented along either said easy axes or along said hard axes and axes dispersed on either side of said axes within the angle of dispersion, means to establish remanent states of magnetization selectively in each of said areas along a hard axis within said angle of dispersion or along an easy axis, and means to determine the state of magnetization in each area comprising means to apply a magnetic field to each area oriented along a hard axis within said angle of dispersion, and means to sense the change in field produced by the change in magnetization in each of those areas in a remanent state of magnetization along said easy axis.

24. In a system for representing information, a plurality of areas of uniaxial anisotropic magnetic material having orthogonal, hard and easy axes, the angular dispersion of said areas being of such magnitude that a remanent state of magnetization may be established oriented along said hard or easy axis and along axes within said angle of dispersion of said hard axis in each area, said areas being arranged in rows in one direction and in columns in another direction, means to apply a first magnetic field to each area of a row oriented along a hard axis in each area within said angle of dispersion of magnitude sufficient to establish a remanent state of magnetization along said hard axis, and means to apply a second magnetic field to each area of each column oriented along an easy axis in each area of magnitude insufficient to shift the magnetization from a hard axis to a remanent state along said easy axis, said first and second magnetic fields when applied to an area common to a row and column forming a resultant field beyond said angle of dispersion of said hard axis, so that the magnetization of said area is shifted from said angle of dispersion of said hard axis, said second field continuing after termination of said first field to assure establishment of a remanent state of magnetization along said easy axis.

25. A thin film element of the type adapted for the storage and switching of intelligence for utilization in a data processing or computing machine, said film being of magnetic material consisting essentially of nickel and iron with the major constituent of nickel and being anisotropic and having at least two directions of magnetization, one of said directions being an easy direction of magnetization and the other of said directions being a hard direction of magnetization, said film having an angular dispersion of said easy direction of magnetization in regions over the and surface of said film varying within an angle between 5 and 60°, said dispersion of said easy direction acting to lock the induced magnetization in said hard direction when a field is applied in said hard direction, said film element having its greatest dimension along said easy axis and decreasing in dimension toward said hard axis.

26. The process of forming a film of anisotropic magnetic material for use as a storage element in a memory system, comprising the steps of evacuating a chamber containing a substrate element, heating said substrate to at least 350° C. in said vacuum, depositing a layer of metal on said substrate in said vacuum, depositing a layer of SiO on said substrate in said vacuum, heating Ni and Fe, the major portion of which is Ni, in said vacuum at a temperature of at least 360° C. to deposit a layer on said substrate while subjecting said layer to a magnetic field of at least 30 oersteds parallel to the surface at a rate of approximately 40 Angstroms a second, and maintaining said magnetic field until said substrate is cooled to not more than 100° C.

References Cited

UNITED STATES PATENTS 3,320,597 5/1967 Hart ............... 340—174

FOREIGN PATENTS 922,602 5/1963 Great Britain.

OTHER REFERENCES

Magnetic Film Memory Design, Raffei et al, proceedings of the IRE, January 1961, p. 155–163.

High Speed Magnetic Film Logic, OGuey et al., pp. 22–23 from 1960 International Solid State Circuits Conference.

A Nondestructive Thin Film Memory, Hart, pp. 28–34 of Solid State Design, January 1964.

BERNARD KONICK, *Primary Examiner.*

V. P. CANNEY, *Assistant Examiner.*

U.S. Cl. X.R.

29—604